(12) United States Patent
Ross

(10) Patent No.: US 7,596,875 B2
(45) Date of Patent: Oct. 6, 2009

(54) HORSE HOOF MEASURING AND SHOEING TEMPLATE

(75) Inventor: Phillip Ross, Bedford, OH (US)

(73) Assignee: Eagle's Eye, LLC, Garfield Heights, OH (US)

(*) Notice: Subject to any disclaimer, the term of this patent is extended or adjusted under 35 U.S.C. 154(b) by 0 days.

(21) Appl. No.: 11/938,840

(22) Filed: Nov. 13, 2007

(65) Prior Publication Data

US 2008/0110645 A1     May 15, 2008

Related U.S. Application Data

(60) Provisional application No. 60/858,988, filed on Nov. 15, 2006.

(51) Int. Cl.
*A01L 11/00* (2006.01)

(52) U.S. Cl. .............................. 33/195; 33/511; 168/45

(58) Field of Classification Search .................. 33/511, 33/512, 515, 195, 3 R, 3 B; 168/45, 48.1
See application file for complete search history.

(56) References Cited

U.S. PATENT DOCUMENTS

| | | | | |
|---|---|---|---|---|
| 82,214 A | * | 9/1868 | Ferren | 33/195 |
| 789,100 A | * | 5/1905 | Murray | 33/195 |
| 1,031,192 A | * | 7/1912 | MacLeod | 33/195 |
| 1,221,557 A | * | 4/1917 | Madden | 33/3 R |
| 1,529,167 A | * | 3/1925 | Clausing | 33/3 B |
| 2,018,630 A | * | 10/1935 | Bliss | 33/3 B |
| 2,605,548 A | * | 8/1952 | Clarke | 33/2 R |
| 2,942,344 A | * | 6/1960 | Brannock | 33/3 B |
| 3,579,837 A | * | 5/1971 | Soriano | 33/3 B |
| 4,429,749 A | * | 2/1984 | Nelms | 168/45 |
| 6,502,642 B2 | * | 1/2003 | Ahrens | 168/45 |
| 6,834,437 B1 | * | 12/2004 | Kilgore et al. | 33/515 |
| 6,907,670 B1 | * | 6/2005 | Teed | 33/195 |

* cited by examiner

*Primary Examiner*—Yaritza Guadalupe-McCall
(74) *Attorney, Agent, or Firm*—Sand & Sebolt

(57) ABSTRACT

A template and method for sizing horseshoes. The template includes a plate against which ground-contacting portion of a horse's hoof is placed. The plate has a plurality of adjustment members thereon. Each adjustment member is individually movable from a first position remote from a perimeter of said hoof, to a second position adjacent the perimeter. When the adjustment members are all in the second position, they are locked into position. The adjustment members define a region that is generally shaped to conform to the perimeter of the horse's hoof. The farrier works a horseshoe until the shoe is able to be received within the region defined by the adjustment members. The worked horseshoe may then be nailed to the horse's hoof.

16 Claims, 6 Drawing Sheets

HORSE HOOF MEASURING AND SHOEING TEMPLATE

CROSS-REFERENCE TO RELATED APPLICATIONS

This application is a standard utility application that claims priority from U.S. Provisional Application Ser. No. 60/858,988, filed Nov. 15, 2006, the disclosure of which is incorporated herein by reference.

BACKGROUND OF THE INVENTION

1. Technical Field

This invention generally relates to a farrier's template. More particularly, the invention relates to a device and a method that ensure the proper measurement of horse hoofs. Specifically, the invention relates to a template having a plurality of adjustment members that are moveable to define a region that conforms to the shape of the horse's hoof and can be used to more easily shape a horseshoe.

2. Background Information

Because the proper tool saves time and therefore saves money while producing a higher quality job, every field of endeavor develops their own specialized tools. Beside the aforementioned benefits, the correct tool reduces accidental damage and provides increased safety of the worker. Specialty tools perform specialized functions. An important subset skill to the profession of blacksmithing is that of a farrier. A farrier specializes in the art of shoeing of horses. The central focus is ensuring that the horse's hoofs are measured correctly and fitted properly.

Farriers tend to use one of two techniques for shoeing a horse. The first technique is cold shoeing where a stock horseshoe is placed against a horse's hoof to check for size and shape and then modifications are made to the shape of the shoe by hammering it when cold. A second technique is hot shoeing. During this process, the farrier will select either an appropriate length of steel stock or a stock horseshoe to make and shape the shoe. Then, through a series of cycles of heating the stock in a forge and pounding the same with a hammer on an anvil, the farrier conforms the shape of the horseshoe to the shape of the horse's hoof. This task takes significant time and physical effort with repeated trips to and from the forging area and back to the horse to be certain that the shoe is sized and fitted properly. Exact conformity between the hoof and the shoe is a multi-step trial and error process. Such a process wastes time and money for the farrier and becomes an aggravation for the animal as well. However, if the shoe is not shaped correctly, the result can be injury and possible lameness being caused in the horse Accordingly, there is a need in the art for a means by which the horseshoes can be properly measured, forged and fitted to horse hoofs with conformity and confidence and without the disadvantages as described above. The development of the device and methodology herein disclosed fulfills this need.

SUMMARY OF THE INVENTION

The device of the present invention is a template and a method of using that template that aids in the sizing, fitting and preparation of horseshoes for horses' hoofs, especially when performed by a trained farrier or blacksmith. The template includes a plate against which ground-contacting portion of a horse's hoof is placed. The plate has a plurality of adjustment members thereon. Each adjustment member is individually movable from a first position remote from a perimeter of said hoof, to a second position adjacent the perimeter thereof. The adjustment members are each locked into their second positions. The adjustment members define a region that is generally shaped to conform to the perimeter of the horse's hoof. The farrier works a horseshoe until the shoe is able to be received within the region defined by the adjustment members. The worked horseshoe may then be nailed to the horse's hoof.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Referring to FIGS. 1-6, there is shown a horseshoe template in accordance with the present invention and generally indicated at 10. Template 10 includes a flat plate 12 made from a suitable material such as acrylic plastic or aluminum. The acrylic plastic is preferably transparent as this makes it easier for the farrier to see the horse's hoof being measured through template 10. Preferably plate 12 is approximately 8¾ inches square, although it may be of any suitable dimensions.

Plate 12 has a first surface 12*a*, a second surface 12*b* (FIG. 4), a peripheral edge 12*c* and corners 12*d*. Plate is provided with an aperture 14 at its center point. Plate 12 further defines a plurality of slots 16 therein that radiate outwardly away from said aperture 14. There are preferably eight slots altogether and aperture 14 and slots 16 extend from upper surface 12*a* through to second surface 12*b* of plate 12. Slots 16 form a star-shaped pattern on plate 12, with the slots 16 being spaced at substantially equal intervals away from each other. Aperture 14 is useful for more clearly viewing the underside of the horse's hoof and for handling template 10 inasmuch as the farrier can insert fingers through aperture 14 to manipulate template 10. It will, of course, be understood that a handle or other protrusion may be placed at the center point of plate 12 to enable the farrier to manipulate the same.

Figure 2:
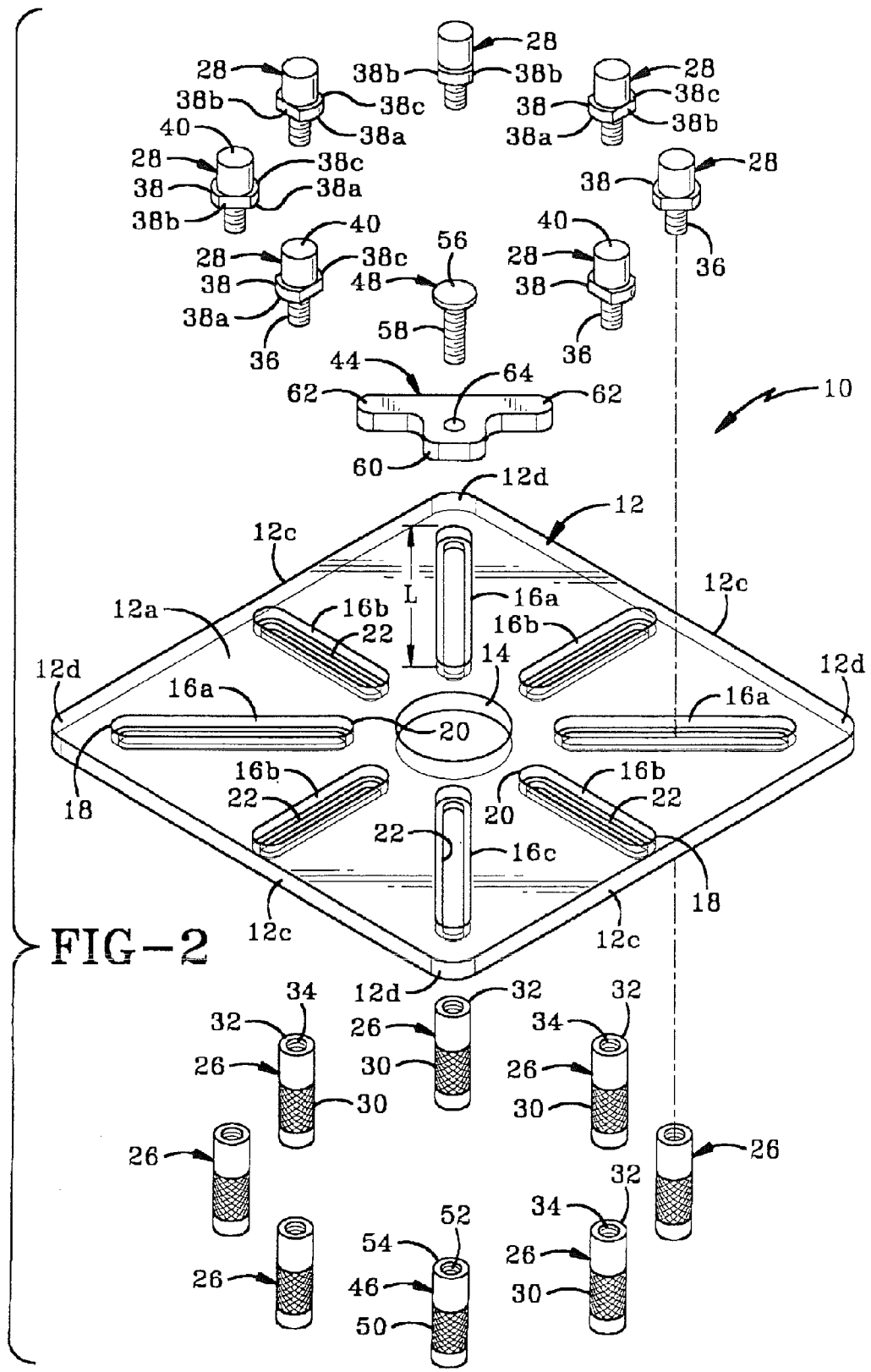
FIG. 2 is an exploded perspective view of the template of FIG. 1.
Figure 3:
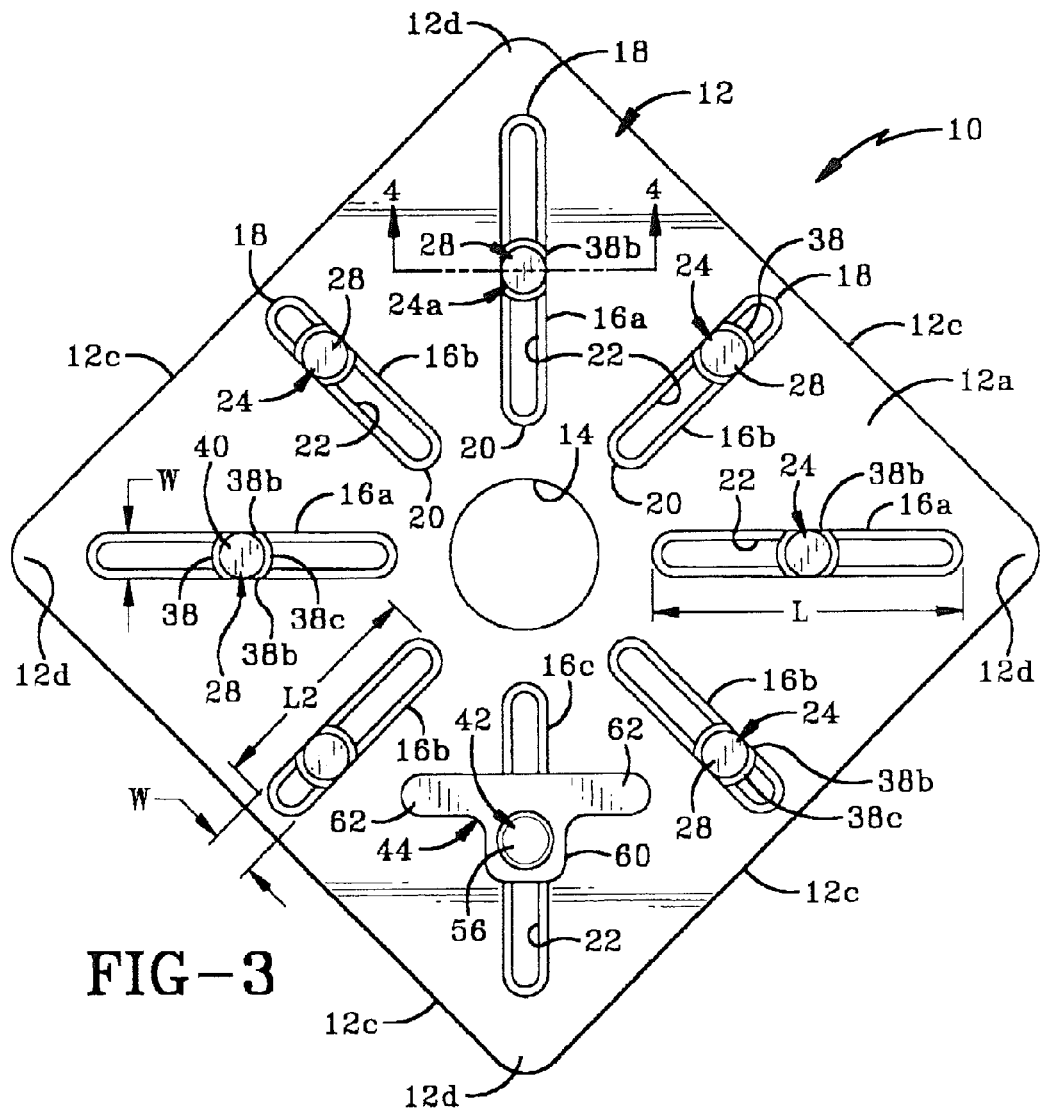
FIG. 3 is a top view of the template.

As shown in FIGS. 2 and 3, slots 16 are of two different sizes, namely slots 16*a* and slots 16*b*, which alternate with each other around plate 12. Each slot 16*a* extends from proximate aperture 14 to proximate corners 12*d*, and terminates a distance inwardly therefrom. Each slot 16*b* originates at a first end 18 that is a spaced distance from aperture 14 and terminates at a second end 20 a spaced distance from a peripheral edge 12*c* of plate 12. Each slot 16*a* has a length "L", a width "W" and first and second ends 18*a*, 20*a*. Each slot 16*b* has a length "L2", a width "W" and first and second ends 18b, 20b. Slots 16a, 16b each include a lip 22 that is spaced a distance "D" (FIG. 4) inwardly from first surface 12a of plate 12 and extends into slot 16. Lip 22 is therefore recessed relative to first surface 12a.

Figure 1:
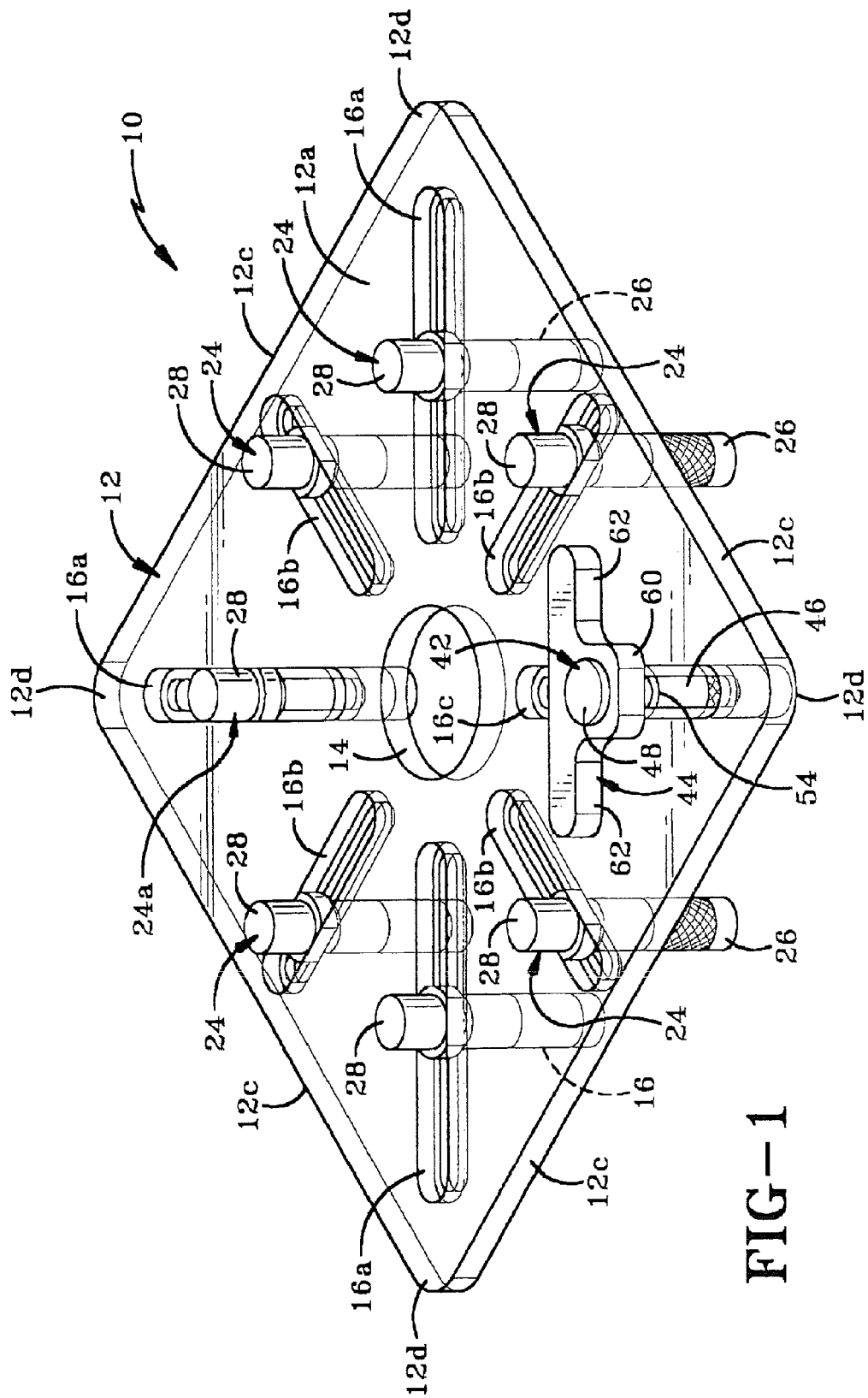
FIG. 1 is a perspective view of a horseshoeing template in accordance with the present invention.

Referring to FIG. 1 and in accordance with another feature of the present invention, template 10 also includes a plurality of adjustment members on plate 12. These adjustment members are each individually movable on plate 12 to positions where they are brought into contact with a horse's hoof, as will be described hereinafter, and are therefore useful for defining the general shape of the hoof for the purpose of sizing and shaping a horseshoe. The adjustment members preferably are pins 24, each of which is engageable with one of slots 16 in plate 12. There are eight pins altogether, seven of which are substantially identical with the eighth one, namely pin 42, being different from the others and will be described hereinafter.

Each pin 24 includes a base 26 and a head 28. Each base 26 is a substantially cylindrical member that has a knurled outer wall 30, an inner end 32 and defines a threaded interior bore 34. Each head 28 has a threaded shaft 36, a flange 38 and a boss 40. The flanges 38 each have a bottom surface 38a, opposed planar sides 38b and an upper surface 38c. Each pin 24 is received in a slot 16 in such a manner that inner end 32 of base 26 is proximate second surface 12b of plate 12.

Figure 4:
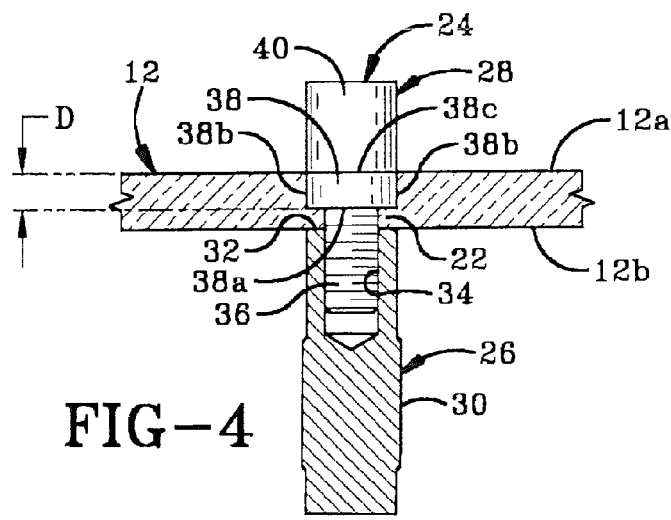
FIG. 4 is a cross-sectional side view through line 4-4 of FIG. 3.
Figure 5:
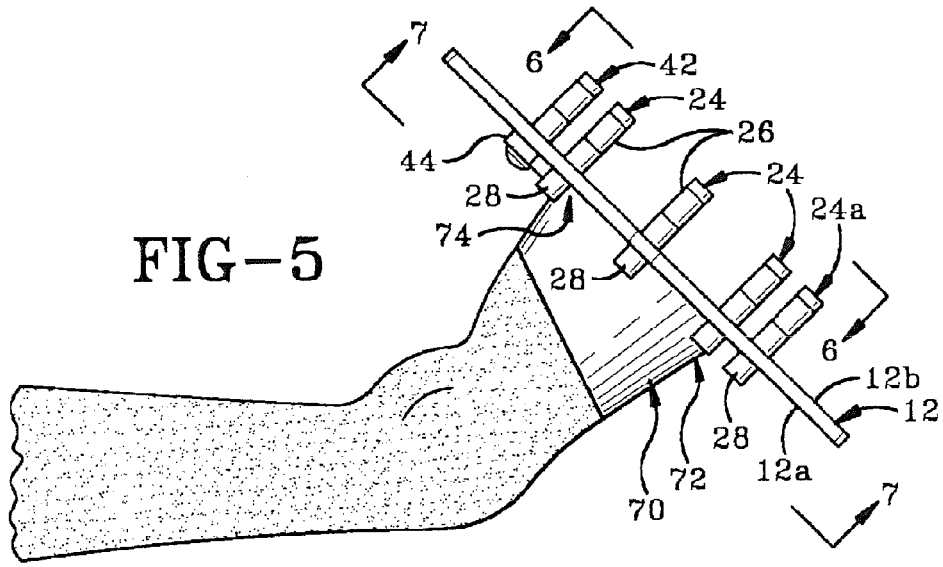
FIG. 5 is a side view of the template being positioned around a horse's hoof.

Head 28 of pin 24 is positioned proximate first surface 12a of plate and the shaft 36 thereof extends through slot 16 and is received in bore 34 of base 26. Pins 24 are therefore disposed substantially at right angles to first surface 12a of plate 12. Flange 38 of head 28 is received within the recessed area of shaft 16 between first surface 12a and lip 22. Bottom surface 38a (FIG. 4) of flange 38 abuts lip 22 and when pin 24 is slidably moved along slot 16, flange 38 rides along lip 22. As shown in FIG. 3, flange 38 is shaped and sized so that opposed sides 38b engage the interior surfaces of slot 16 and flange 38 is thereby tightly retained within slot 16. The width of flange 38 between sides 38b is substantially equal to the width "W" of slot 16 and this, in combination with the shape of flange 38, tends to resist any rotation of flange 38 within slot 16. As shown in FIG. 4, an upper surface 38c of flange 38 preferably is substantially flush with first surface 12a of plate 12

Pins 24 may be unlocked by rotating head 28 in a first direction or tightened by rotating head 28 in a second direction. Rotating head 28 in the first direction causes shaft 36 to be threaded out of bore 34, thereby increasing the distance between flange 38 on head 28 and inner end 32 of base 26. Lip 22 is therefore no longer clamped between flange 38 and inner end 32. When pins 24 are in this unlocked condition, they can be slidably moved along slot 16 to any position between first and second ends 18, 20. Rotating head 28 in the second direction causes shaft 36 to be threaded into bore 34, thereby decreasing the distance between flange 38 and inner end 32 of base 26. Lip 22 therefore becomes clamped between flange 38 and inner end 32 of base 26 and pin 24 cannot be moved along slot 16 and is locked into place at some point between first and second ends 18, 20.

Figure 6:
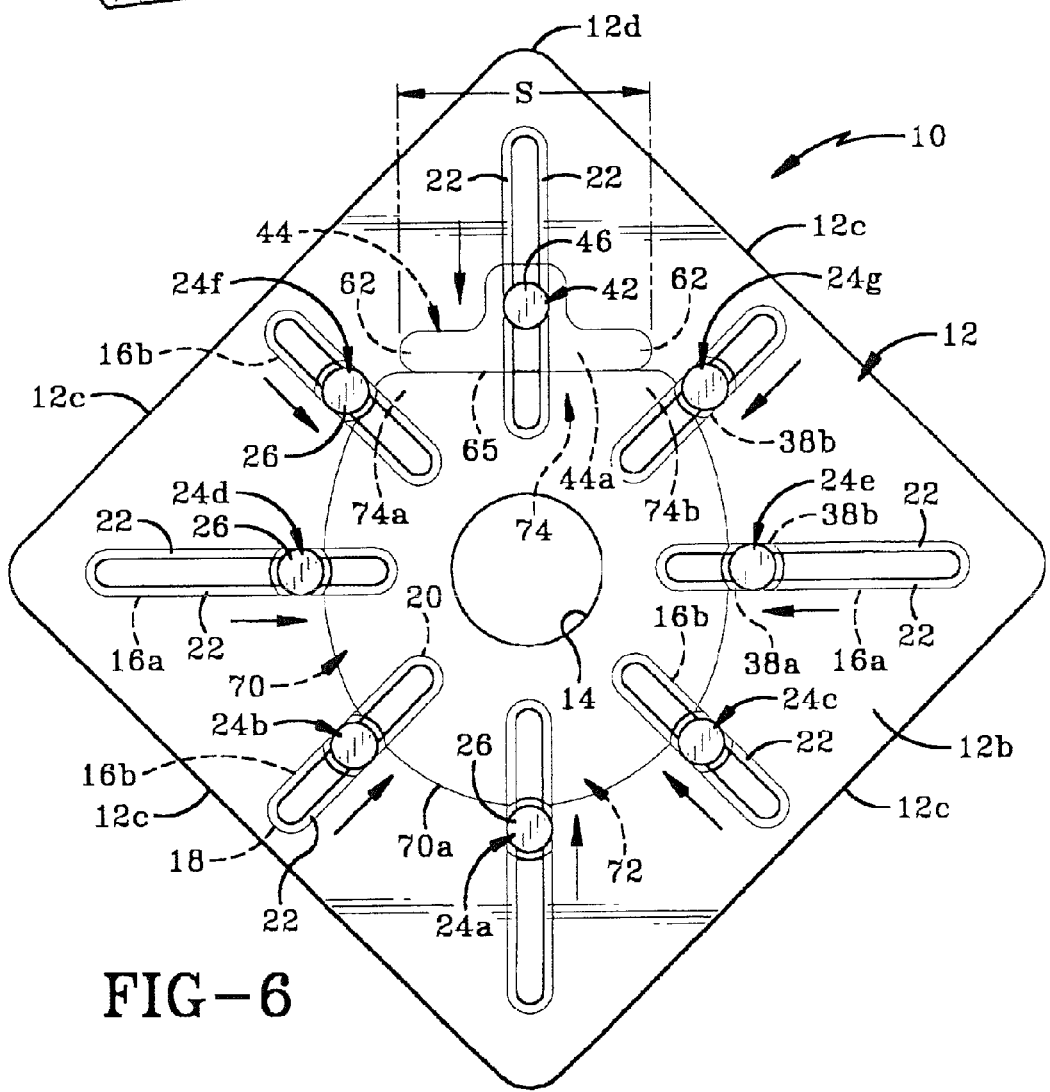
FIG. 6 is a rear view of the template through line 6-6 of FIG. 5 and showing the relative position of the horses' hoof therein.
Figure 7:
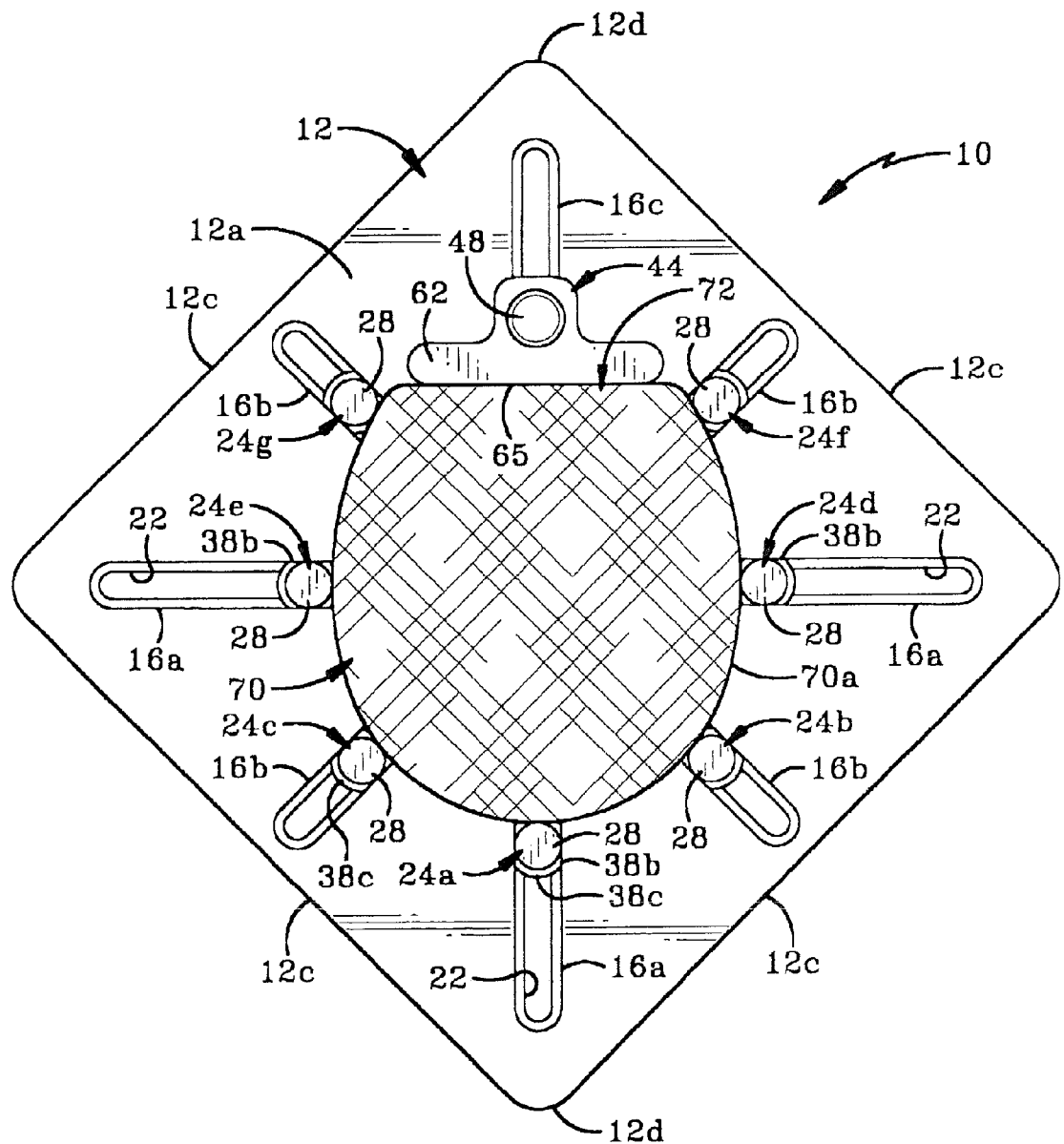
FIG. 7 is a front view of the template taken through line 7-7 of FIG. 5.

In accordance with yet another feature of the present invention, the eighth slot 16c is slidably engaged by a pin 42. Slot 16c is substantially identical to slots 16a, but is differentiated herein in order to discuss the action of pin 42 more clearly. Pin 42 includes a heel plate 44, a base 46 and a screw 48. Base 46 has a knurled outer surface 50, a bore 52 and an inner end 54. Screw 48 has a head 56 and a threaded shaft 58. Shaft 58 is sized to be received in bore 52 of base 46. Heel plate 44 is a substantially T-shaped member having a leg 60 and two arms 62 and defining a hole 64 in leg 60. Shaft 58 of screw 48 is received through hole 64, through slot 16c and into bore 52 of base 46. Both leg 60 and arms 62 of heel plate 44 are wider than width "W" of slot 16c. Underside 44a (FIG. 6) of heel plate 44 abuts first surface 12a of plate 12 when screw 48 is engaged with base 46. In much the same manner as pins 24, pin 42 can be unlocked by rotating screw 48 in a first direction and tightened by rotating screw 48 in a second direction. When pin 42 is in an unlocked condition, heel plate 44 may be slidingly moved along slot 16c toward or away from aperture 14 in template 10. When pin 42 is in a tightened condition, heel plate 44 is locked into position in slot 16c. It should be noted that heel plate 44 includes an inner surface 65 that has a length "S" (FIG. 6). It should further be noted that heel plate 44 is pivotable about shaft 58 of screw 48 when pin 42 is in an unlocked condition. This allows the farrier to set the angle of inner surface 65 in accordance with the shape of the inside edge of the horse's hoof as will be hereinafter described.

Template 10 is used in the following manner. As a first step in the shoeing process, the farrier will trim the horse's hoof as is customarily done. The farrier then lift's the horse's leg and positions hoof 70 on front surface 12a of plate in the manner shown in FIG. 5. Hoof 70 is positioned so that the toe 72 of hoof 70 is proximate a toe pin 24a and the heel 74 of hoof 70 is proximate heel plate 44. At this stage, most or all of pins 24 and pin 42 are in the unlocked condition and are therefore able to be slidingly moved in their respective slots 16. Referring to FIG. 6, hoof 70 is shown in outlined so as to not complicate the drawing unnecessarily. Heel plate 44 is slidingly moved inwardly toward aperture 14 until an inner surface 65 of heel plate 44 abuts the heel 74 of hoof 70. Heel plate 44 is pivoted as needed so that inner surface 65 assumes the angle of the horse's heel 74. Typically, the inside 74a of the heel 74 does not extend as far rearwardly from the toe 72 as does the outside of the heel 74 and heel plate 44 will therefore be angled relative to the position shown in FIG. 6.

When heel plate 44 is correctly oriented, pin 42 is tightened by rotating the base 46 in a second direction. This clamps heel plate 44 against first surface 12a of plate 12 and prevents the orientation of heel plate 44 from changing. Toe pin 24a is then slidingly moved down slot 16 until pin 24a lightly contacts perimeter 70a of hoof 70. Base 26 of pin 24a is rotated to tighten and lock pin 24a into position. This helps to lock template 10 around hoof 70. Preferably, the next two pins to be slidingly moved into contact with perimeter 70a of hoof 70 are pins 24b and 24c. Bases 26 of pins 24b, 24c are then finger-tightened to lock them into place in their respective slots 16. Pins 24d and 24e are slidingly moved into position against hoof 70 and secured in place. Finally, pins 24f and 24g are moved into position against hoof 70 and are secured in place. Pins 24a-24g generally outline a region that resembles perimeter 70a of hoof 70 and this region is therefore usable as a template for shaping and sizing a horseshoe 80.

Figure 8:
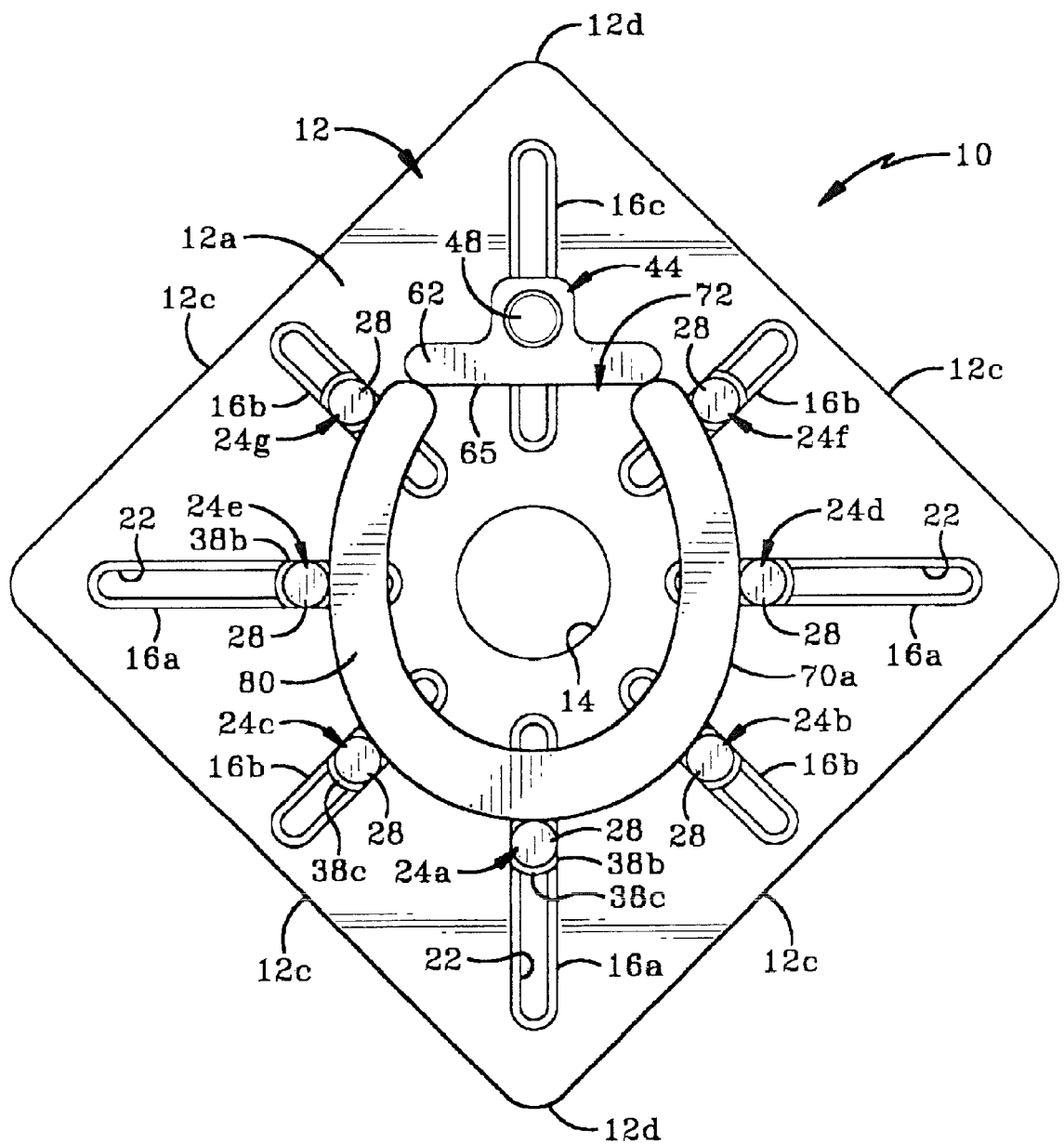
FIG. 8 is a front view of the template showing a horseshoe fitted therein.

Once all of the pins 24a-24g are all locked into position, template 10 is removed from hoof 70 and a stock horseshoe 80 of the most appropriate size is selected. Horseshoe 80 is hammered into shape using a forge or cold techniques so that shoe 80 fits into the configuration formed by pins 24a-24g and heel plate 4 (FIG. 8). If the farrier decides to shoe cold, then the template 10 is placed on a suitable flat surface or in a step vice. Either of first and second surfaces 12a, 12b can face upwardly toward the farrier. Shoe 80 is shaped and is periodically compared with template 10 by attempting to position shoe 80 in the region of template 10 that was previously occupied by horse's hoof 70. If first surface 12a is selected so that bosses 40 of pins 24 extend toward the farrier, then shoe 80 must be oriented so that the ground-contacting surface of shoe 80 faces downwardly away from the farrier. This is illustrated in FIG. 8. If second surface 12b is selected so that knurled surface 30 of pins 24 extends toward the farrier, then shoe 80 must be oriented so that the ground-contacting surface of shoe 80 faces the farrier. If the farrier decides to shoe hot, then template 10 is placed on a suitable flat surface or a step vice and is positioned so that second surface 12b and bases 26 of pins 24 are facing upwardly toward the farrier. When shoe 80 is pulled from the forge, it is positioned on or near pins 24 with the ground-contacting surface of shoe 80 facing upwardly. The hot shoe should not go below knurling 30 on pins 24 as this may damage surface 12b of plate 12. As with cold shoeing, the size and shape of shoe 80 is compared to the shape of the region formed by pins 24 on template 10 and is corrected as needed. When the farrier believes that shoe 80 is shaped to the correct size, shoe 80 is quenched and the final shaping is done cold. When shoe 80 is at the correct size and shape, the shoe 80 will snugly fit into the region defined by pins 24a-24g and will be able to abut plate 12. Pins 24a-24g and 42 can be moved to the unlocked condition in order to more easily release horseshoe 80 and to place template 10 in condition to receive another horse's hoof thereon for sizing purposes. When template 10 is not in use, pins 24a-24g and 42 may be in either of a locked or unlocked condition and may be positioned anywhere along the length of the associated slot 16. The worked horseshoe 70 may then be nailed to the horse's hoof in a conventional manner. It has been found that template 10 reduces the length of time required to make a correctly fitting horseshoe and simplifies the procedure for the farrier.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A template for sizing horseshoes comprising:
a plate adapted to be positioned in abutting contact with a ground-contacting portion of a horse's hoof;
a plurality of adjustment members disposed on the plate, each adjustment member being individually movable from a first position remote from a perimeter of said hoof, to a second position adjacent the perimeter, and when said adjustment members are all in the second position they define a region that is generally shaped to conform to the perimeter of the horse's hoof;
wherein each adjustment member is a pin that is disposed at right angles to the plate and the adjustment member is movable between a locked condition and an unlocked condition;
the adjustment members are placeable into the locked condition when in the second position to retain the shape of the region, and the plate defines a plurality of slots therein; and each of said pins is engaged in one of the slots.

2. The template as defined in claim 1, wherein the pins are slidably movable along the slots.

3. The template as defined in claim 1, wherein each pin comprises: a base defining a bore therein;
a head, said head having a shaft that extends outwardly away therefrom, and wherein said shaft is engagable in the bore of the base, and when the pin is engaged in the slot, the base thereof is proximate a first surface of the plate and the head thereof is proximate a second surface of the plate, and the shaft extends through the slot to connect the base and head together.

4. The template as defined in claim 3, wherein the bore and the shaft threadably engage each other; and the base is rotated in a first direction to move the pin to the unlocked condition whereby the pin is slidable along the slot; and the base is rotated in a second direction to move the pin to the locked condition whereby the pin is fixed in position in the slot.

5. The template as defined in claim 3, wherein a first one of the pins further includes a heel plate that is disposed between the head and base of that first pin, and said heel plate is adapted to abut the heel of the horse's hoof.

6. The template as defined in claim 5, wherein the heel plate includes a pair of arms that extend outwardly beyond a peripheral edge of the slot, and said arms are adapted to abut the heel of the horse's hoof.

7. The template as defined in claim 6, wherein the heel plate further includes a leg that extends rearwardly from the arms such that the heel plate is generally T-shaped; and wherein the heel plate further defines a hole in the leg and the shaft of the first pin extends through the hole, and wherein the heel plate is radially rotatable about the shaft.

8. The template as defined in claim 3, wherein each head of a plurality of the pins further includes a flange that surrounds an upper portion of the shaft thereof; and the flange is sized to be fittingly received in the associated slot.

9. The template as defined in claim 8, wherein each slot in the plate further includes a peripheral lip which extends into the slot, said lip being recessed relative to a first surface of the plate; and wherein the flange on each of the pins abuts the lip in the associated slot and rides therealong when the pin is slidably moved along the slot.

10. The template as defined in claim 1, wherein the slots in the plate form a star-shaped pattern that radiates outwardly from a center point on the plate.

11. The template as defined in claim 10, wherein the plate further defines an aperture at the center point of the plate; and wherein each slot has a first end disposed a spaced distance from the aperture and a second end disposed a spaced distance from a peripheral edge of the plate.

12. A method of sizing a horseshoe comprising the steps of:
positioning a ground-contacting surface of a horse's hoof against a first surface of a template;
moving a plurality of adjustment members on the template into contact with a perimeter of the horse's hoof; wherein moving the adjustment members includes the steps of rotating a base portion of each adjustment member in a first direction to place that adjustment member in an unlocked condition, sliding the adjustment member alone a slot in the template until the adjustment member abuts the perimeter of the horse's hoof; and rotating the base portion of the adjustment member in a second direction to place the adjustment member in a locked condition;
locking the adjustment members in position on the template; wherein the adjustment members define a region on the template that is conformed to the general shape of the perimeter of the horse's hoof;
removing the plate from engagement with the horse's hoof;
selecting a stock horseshoe size and comparing the stock horseshoe with the region on the template; and,
working the stock horseshoe using cold or hot shoeing techniques until the horseshoe is receivable into the region formed by the adjustment members.

13. The method as defined in claim 12, wherein the step of moving the adjustment members further comprises the step of:

positioning a heel plate disposed on one of the adjustment members against the heel portion of the horse's hoof;

rotating the heel plate until a heel contacting surface thereof assumes the orientation of the heel;

rotating the base portion of one of the adjustment members in the second direction to clamp the heel plate against a first surface of the template to retain the orientation of the heel plate.

14. The method as defined in claim 12, wherein the adjustment members are disposed at right angles to the template and a first portion of each adjustment member extends outwardly from the first surface of the template and a second portion of each adjustment member extends outwardly from a second surface of the template; and wherein method of sizing the horseshoe further comprises the step of fitting the worked horseshoe into the region of the template defined by the adjustment members.

15. The method as defined in claim 14, wherein the step of fitting the worked horseshoe includes the step of placing a ground-contacting surface of the horseshoe onto the first surface of the template and between the first portions of the adjustment members that extend outwardly from the first surface.

16. The method as defined in claim 14, wherein the step of fitting the worked horseshoe includes the step of placing a non-ground contacting surface of the horseshoe onto the second surface of the template and between the second portions of the adjustment members that extend outwardly away from the second surface thereof.

* * * * *

UNITED STATES PATENT AND TRADEMARK OFFICE
CERTIFICATE OF CORRECTION

PATENT NO. : 7,596,875 B2
APPLICATION NO. : 11/938840
DATED : October 6, 2009
INVENTOR(S) : Phillip Ross It is certified that error appears in the above-identified patent and that said Letters Patent is hereby corrected as shown below:

Column 6; line 50    Change "alone" to "along" -- along a slot in the template... --

Signed and Sealed this

Twenty-fourth Day of November, 2009

David J. Kappos
*Director of the United States Patent and Trademark Office*